United States Patent [19]

Genovese

[11] Patent Number: 5,777,659
[45] Date of Patent: Jul. 7, 1998

[54] DUAL-BEAM, REFLEX-CONTROLLED LASER CIRCUIT FOR AN ELECTROPHOTOGRAPHIC PRINTER

[75] Inventor: Frank C. Genovese, Fairport, N.Y.

[73] Assignee: Xerox Corporaiton, Stamford, Conn.

[21] Appl. No.: 624,272

[22] Filed: Mar. 29, 1996

[51] Int. Cl.⁶ .................................................. H04N 1/21
[52] U.S. Cl. ............................................................ 347/252
[58] Field of Search ............................... 347/130, 132, 347/133, 134, 135, 246, 247, 250, 252, 253, 254, 255, 261

[56] References Cited

U.S. PATENT DOCUMENTS

| 4,288,822 | 9/1981 | Hareng et al. | 358/296 |
|---|---|---|---|
| 4,841,137 | 6/1989 | Mochizuki et al. | 250/236 |
| 5,444,463 | 8/1995 | Kovacs | 347/118 |
| 5,497,181 | 3/1996 | Paoli | 347/133 |
| 5,583,557 | 12/1996 | Yamamoto et al. | 347/235 |
| 5,668,590 | 9/1997 | Maruo et al. | 347/256 |

*Primary Examiner*—Matthew V. Nguyen
*Attorney, Agent, or Firm*—R. Hutter

[57] ABSTRACT

A raster output scanner for use in an electrophotographic printer uses two light sources to create two scan lines on a photoreceptor simultaneously. The two light sources are operated in an alternating fashion, and the intensity of the light sources is monitored by a single sensor. The sensor is associated with a reflex-based exposure control system, which operates to shut off a particular light source when the exposure created by the light source reaches a threshold level.

12 Claims, 4 Drawing Sheets

DUAL-BEAM, REFLEX-CONTROLLED LASER CIRCUIT FOR AN ELECTROPHOTOGRAPHIC PRINTER

CROSS-REFERENCE TO RELATED PATENT APPLICATION

Cross-reference is made to the following U.S. patent application being filed simultaneously herewith: "High-Speed, Reflex-Controlled Laser Circuit for an Electrophotographic Printer," Ser. No. 08/623,242, filed Mar. 27, 1996, assigned to the assignee hereof.

FIELD OF THE INVENTION

The present invention relates to a raster output scanner, for use in an electrophotographic printer. More specifically, the present invention relates to a raster output scanner which utilizes both a set of simultaneously-operating scanning beams, and which also utilizes a reflex exposure control.

BACKGROUND OF THE INVENTION

Electrophotographic "laser" printers, wherein a laser scan line is projected onto a photoconductive surface to create an image to be printed, are well known. In the case of printers, facsimile machines, and the like, it is common to employ a raster output scanner (ROS) as a source of optical patterns to be imaged on photographic film or an electrostatically charged photoreceptor (a photosensitive plate, belt, or drum) for purposes of printing. The ROS provides a laser beam which switches on and off according to electronic image data associated with the desired image to be printed, exposing the charged photoreceptor point by point as the beam moves, or scans, across its surface. Commonly, the surface of the photoreceptor is selectively imagewise discharged by the laser beam in locations to be printed white, to form the desired image on the photoreceptor. Modulation of the scanned beam creating the desired latent image on the photoreceptor is typically implemented by digital circuitry designed to control the level of operating current that defines the light flux output of a high speed laser diode. A common technique for deflecting the modulated laser beam to form a scanline across the photoreceptor surface uses a motor driven rotating optical polygon with multiple reflecting surfaces; the laser beam from the collimated laser diode source is reflected by the facets of the polygon, creating a scanning motion of the beam, which is optically imaged to form a sharply focused scan line on the photoreceptor surface. A closely spaced regular array of scan lines on a photoreceptor collectively form a raster for exposing the desired latent image. Once a latent image is formed on the photoreceptor, the latent image is subsequently developed with toner, and the developed image is transferred to a copy sheet, as in the well-known process of electrophotography.

The general principle of using multiple, independently operated laser beams to increase the effective writing speed of a laser imaging system is well known in the prior art. In a typical design, two or more beams are reflected by the facets of a rotating polygon mirror in such a way that the beams scan across the photoreceptor simultaneously, creating scan lines directly adjacent each other, or spaced apart by a whole number of scan lines. The multiple beams can be created in various ways, such as independent laser devices collimated into parallel beams by faceted optical elements, multiple laser diodes in a single package with common conventional optics, or multiple laser diodes formed in a single semiconductor structure with diffractively conditioned beams.

SUMMARY OF THE INVENTION

According to one aspect of the present invention, there is provided a raster output scanner for an electrophotographic printer, comprising a first light source adapted to output a first beam and a second light source adapted to output a second beam. Means are provided for scanning the first beam and the second beam across a photosensitive surface to form a first scan line and a second scan line respectively to expose pixel spots thereon, the first scan line being parallel to the second scan line and spaced from the second scan line by a predetermined number of scan lines. A controller provides an alternating duty cycle whereby the first light source is enabled to expose a pixel spot on the photosensitive surface during a first portion of the duty cycle, and the second light source is enabled to expose a pixel spot on the photosensitive surface during a second portion of the duty cycle.

According to another aspect of the present invention, there is provided a raster output scanner for an electrophotographic printer, comprising a first light source adapted to output a first beam and a second light source adapted to output a second beam. Means are provided for scanning the first beam and the second beam across a photosensitive surface to form a first scan line and a second scan line respectively to expose pixel spots thereon, the first scan line being parallel to the second scan line and spaced from the second scan line by a predetermined number of scan lines. A single sensor for measures light intensity from the first light source and the second light source.

DETAILED DESCRIPTION OF THE INVENTION

Figure 1:
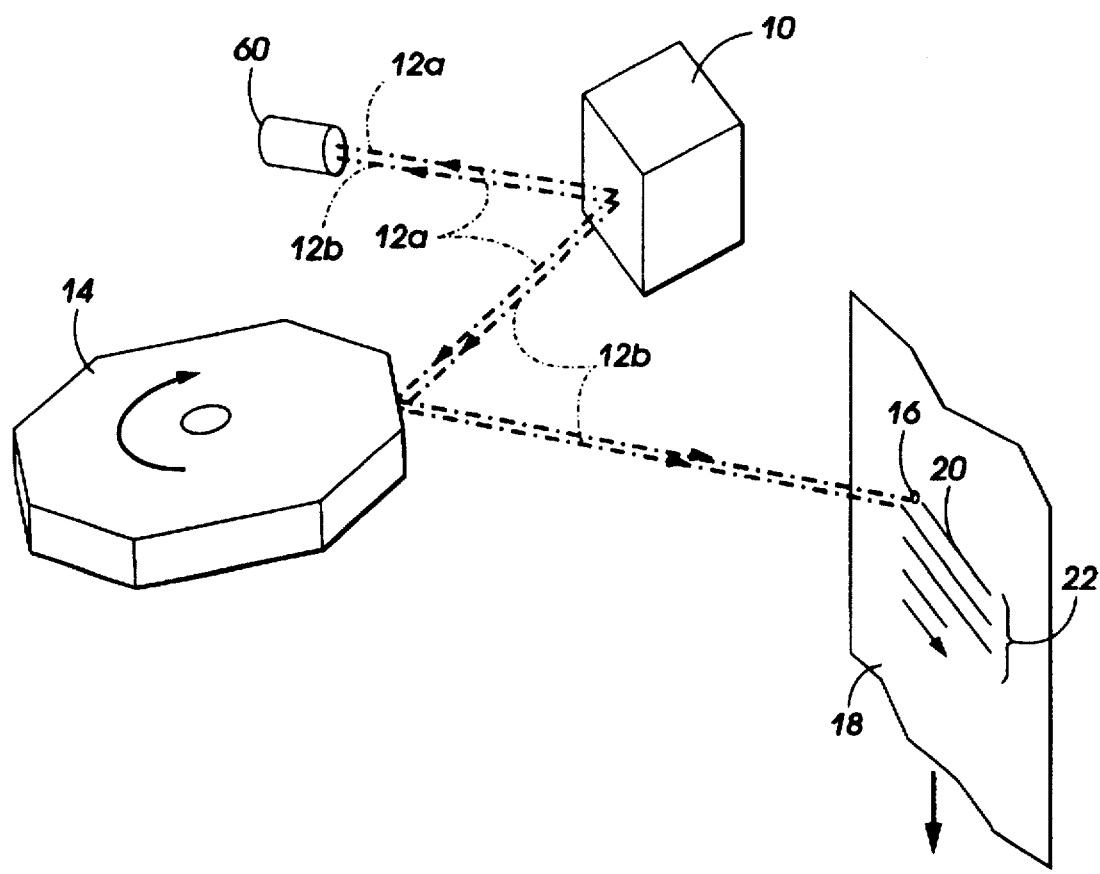
FIG. 1 is a perspective view showing the basic elements of a dual-beam raster-output scanner (ROS)

FIG. 1 shows the basic configuration of a dual scanning system used, for example, in an electrophotographic printer or facsimile machine. A laser source 10 produces, in this case, a pair of collimated laser beams, also referred to as a "writing beams," 12a, 12b which are reflected by the facets of a rotating polygon 14. Each facet of the polygon 14 in turn deflects the writing beams 12a, 12b to create focussed spots 16 on the precharged surface of photoreceptor 18. Laser source 10 also includes means for modulating the beams 12a, 12b according to image data entered therein. The localized light flux in sharply focussed spots 16 incident at a particular location on the surface of photoreceptor 18 corresponding to a picture element (pixel) in the generated image, discharges the surface for pixels of the desired image which are to be printed white in a charged-area development system (or, alternately, areas which are to be printed black in a discharged-area development system). In locations having pixels which are to be printed black, a writing beam such as 12a or 12b is momentarily interrupted through the action of the modulator within source 10, so that the pixel at that location on the surface of photoreceptor 18 remains unexposed and will not therefore be discharged. It is to be understood that gray levels are typically imaged in like manner by utilizing a range of exposure levels intermediate between the fully exposed and unexposed levels. Thus, digital data in the form of serial bit streams modulating laser source 10 is rendered line by line as an electrostatic latent image on the surface of photoreceptor 18.

The rotational motion of polygon 14 results in a focused spot 16 moving across the surface of photoreceptor 18 to form a scan line 20 of selectively discharged areas on photoreceptor 18. At the same time, the surface of photoreceptor 18 is slowly translated at a constant velocity so that the regular periodic scanning of spots 16 across the moving photoreceptor 18 creates a closely spaced array of scan lines 20, called a raster 22, on the surface of photoreceptor 18, forming the desired continuous image to be printed. One skilled in the art will appreciate that such a configuration has traditionally further included any number of lenses, mirrors and translational mechanisms to accommodate a specific design.

The dual-beam system shown generally in FIG. 1 generates two separate scan lines 20 on the surface of photoreceptor 18, doubling the rate at which pixels can be individually processed and a desired image completed, and thereby doubling the throughput capability of the imaging system. When using two separate writing beams generated from two independent laser diode sources, there are often noticeable performance differences between the two channels. If one channel is less energetic than the other (through, for example, aging or thermal degradation of the laser diodes), scan lines processed by the different laser diodes will be discharged to different extents, with a possible creation of noticeable artifacts such as halftone moiré patterns and color hue shifts in the finished prints. It is therefore desirable, when using a multi-beam system, to provide a reliable system for ensuring precise exposure control of both laser diodes.

One preferred embodiment of the present invention proposes a dual-beam ROS in which a first light source and a second light source (typically laser diode sources) operate in an alternating fashion within successive exposure cycles, each light source in turn fully exposing one pixel, such as 16, on a separate scan line on the surface of photoreceptor 18 to form the desired latent image. This splitting of the exposure cycle, or alternation of activating the two light sources, enables a single reflex-based exposure control system to be sensitive to the operation of both light sources.

Further as shown in FIG. 1, there is provided, either off-axis with respect to the writing beams 12a, 12b, or disposed in a manner with respect to the back-facets of the laser diodes generating writing beams 12a, 12b within laser source 10, a single sensor 60 which is provided to measure the light emission from either laser diode. This sensor 60 is associated with an exposure controller, which will be described in detail below. In brief, the exposure controller itself operates on a split sensing cycle, measuring the light flux output of the first light source in the first portion of the exposure cycle, and the light flux output from the second light source in the second portion of the exposure cycle. In this way, a single sensor can be configured to effectively control two otherwise independent light sources essentially simultaneously.

Figure 2:
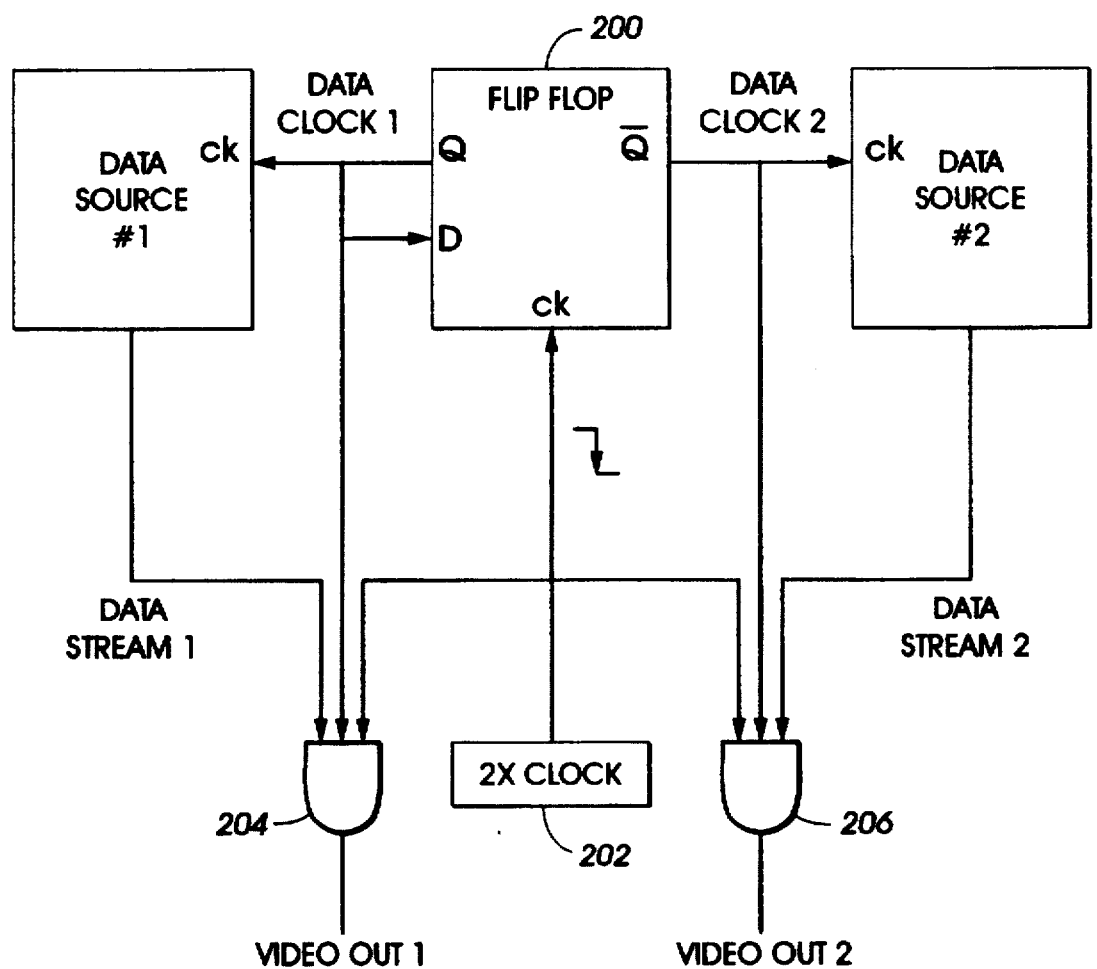
FIG. 2 is a simplified schematic diagram showing an apparatus for alternating operation of two laser diodes in a multi-beam raster output scanner.
Figure 3:
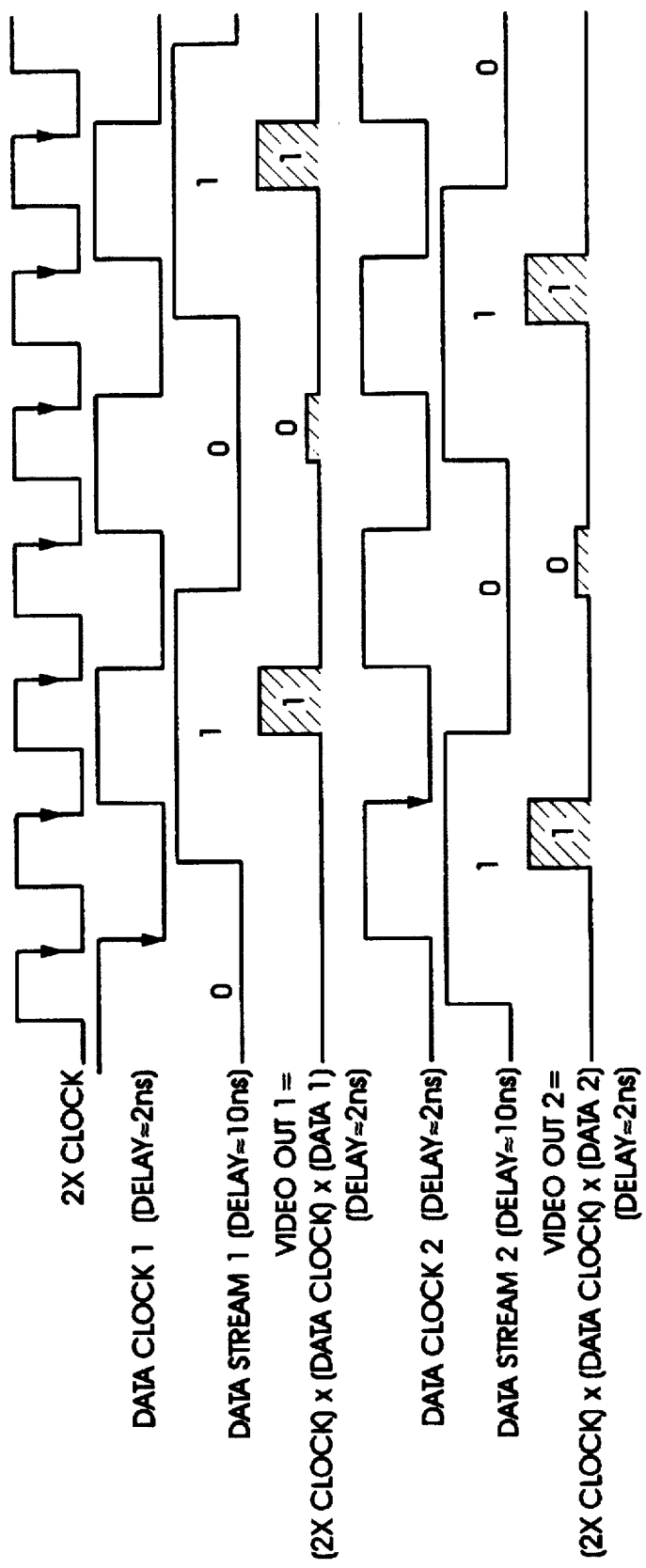
FIG. 3 is a timing diagram illustrating the operation of the apparatus of FIG. 2.

Turning to the operation of first and second light sources in a split exposure cycle, attention is directed to FIGS. 2 and 3. FIG. 2 is a simplified schematic diagram of an apparatus for merging data streams corresponding to two scan lines being simultaneously imaged on a photoreceptor 18; FIG. 3 is a timing diagram illustrating operation of the elements of FIG. 2.

With any dual-beam or multi-beam scanning system, the beams are configured to expose pixels along separate scan lines in the image raster. The two scan lines in a dual beam system may be directly adjacent each other, or may be spaced apart by a predetermined number of scan lines depending on the ROS design interlace factor. One writing beam such as 12a will be dedicated to exposing pixels along the "odd" scan lines on photoreceptor 18, and the remaining beam 12b will be dedicated to exposing pixels along the "even" scan lines. The different scan lines will, of course, be exposed in separate latent patterns according to different streams of digital data, this digital data ultimately corresponding to the image desired to be printed in a manner generally familiar in the art of laser printing.

As shown in FIG. 2, the digital data, in binary form intended to control the modulation of one of two laser diodes in laser source 10, is represented by DATA SOURCE #1, while the parallel stream of digital data for controlling the second diode is shown as DATA SOURCE #2. It will be understood by those familiar with the art of computer printing, that the data sources shown herein as functional blocks represent bit-on-demand digital subsystems typically containing computer RAM or similar digital storage media, as well as interfaces to external networks (not shown) through which images are processed. In a typical single-beam system, the information contained in both data sources would be combined and presented as a single long serial stream of data for modulating the single laser diode which must exposes all the pixels in the entire desired latent image.

A flip-flop circuit generally indicated as 200 is configured to provide data clocks to DATA SOURCE #1 and DATA SOURCE #2 that are 180 degrees out of phase using the Q and NOT-Q logic outputs as shown. Flip-flop 200 is toggled by a 2X clock here indicated as 202, at exactly twice the system bit rate desired from the two data sources in parallel, such that DATA SOURCE #1 and DATA SOURCE #2 present valid data bits in sequence on every other cycle of the 2X clock. The logic levels of the 2X clock 202, the flip-flop 200 outputs, and the data streams from DATA SOURCES #1 and 2 are combined to produce a logically "true" state of one-half clock cycle duration at the output of AND gate 204 when DATA SOURCE #1 presents one "true" bit, and a logically "true" state of one-half clock cycle duration at the output of AND gate 206 when DATA SOURCE #2 delivers one "true" bit.

FIG. 3 is a timing diagram showing voltage waveforms at various points in FIG. 2, including the small timing skews associated with typical propagation delays in real electronic components. In the example shown in FIG. 3, it is desired to print out data corresponding to the bit sequence 0101 from DATA SOURCE 1, and the bit sequence 1010 from DATA SOURCE 2 (the video output for "0" is shown slightly raised in FIG. 3 for clarity). As can be seen, the 2X clock waveform at the top of FIG. 3 defines both DATA CLOCK 1 and DATA CLOCK 2, which is shown as being merely the inverted waveform of DATA CLOCK 1. The data inputs to the AND logic gates are "non-return to zero" or NRZ, which is typical for many digital data sources. The action of the logical AND gates is to generate a short pulse of one-half clock cycle duration whenever a true data bit is received from a data source, and symmetrically sequence the outputs labeled VIDEO OUT 1 and VIDEO OUT 2, as shown in FIG. 3. The purpose for shortening and sequencing the pulses will be described in more detail below.

It will be understood by those familiar with the art, that although dual light sources have twice the intrinsic exposure power of a single light source, in the proposed system each is operated at only 50% duty cycle and must be proportionately more energetic to cause full exposure of pixels in the allotted time. One possible solution is to employ laser diodes with higher optical power output; for example, 20 mW laser diodes can be used in place of the usual 3 to 5 mW devices typically found in a ROS scanner. Another possible approach would be to improve the numerical aperture of the collimation subsystem to increase overall light collection efficiency. However, in the preferred embodiment of the present invention, a twofold improvement in imaging speed is realized because the primary mechanism limiting the sustained operating level of most laser diodes is excessive junction heating, and a reduced duty cycle permits operation at higher peak power for the same average junction dissipation. Depending on the I-V curves, bias points, and optical characteristics of the laser diode device, operation at a reduced duty cycle can actually be more efficient and yield more useful optical output power than continuous operation.

In order to design a practical dual-beam scanner using the alternating cycle of the present invention, the differential image skew resulting from sequencing the pixel exposures on the "odd" and "even" scan lines must be considered. The scanner magnification M and the dual diode spacing d satisfy the relationship:

$$Md=S=(2N+1)/R$$

where $R=1/\Delta X$ is the scan line resolution, N is an integer, and S is the spacing between the parallel "even" and "odd" simultaneously exposed scan lines on the photoreceptor surface. For a 600 SPI scanner, $\Delta X=42.3$ microns. The quantity (2N+1) is called the interlace factor and represents the spacing between simultaneously exposed scan lines which is consistent with a properly interlaced image; it will be noted that the interlace factor must always be an odd number because in a dual beam system, one laser beam exposes the even scan lines, and one beam exposes the odd scan lines. Historically, this relationship was used to enable high line resolution using laser diode sources where, because of manufacturing and performance limitations, the spacing d could not be made small enough to allow adjacent scan line exposure (N=0).

It will be apparent that when two scan lines are generated on the photoreceptor surface with the exposure of sequential pixels constrained to alternating timing (that is, a pixel in a scan line such as 12b cannot be processed until the pixel in scan line 12a is complete), the resulting pixels will naturally be staggered along the pairs of scan lines with the offset being exactly one-half pixel. In order to compensate for this imaging defect, the laser diodes associated with writing beams 12a, 12b respectively in laser source 10 can be reoriented relative to the scan direction so that the sources are skewed by a compensating amount. The skew angle for the diode sources is given by:

$$\theta=\tan^{-1}[1/(2(2N+1))]$$

As an example, for laser diodes spaced so that the resulting scan lines 12a, 12b are (2N+1)=5 scan lines apart, $\theta=\tan^{-1}[0.1]=5.7$ degrees with respect to a line normal to the scan direction. Reorienting the diodes by this small angle corrects the skew without materially altering the effective tangential and saggital beam divergences.

The alternating operation of the dual diodes in the present invention facilitates the use of a reflex exposure control system using a single sensor to regulate both laser diodes in source 10 at the same time. A basic version of a reflex exposure-control system which can be incorporated in the present invention is described in detail in the above-identified patent application incorporated by reference.

Figure 4:
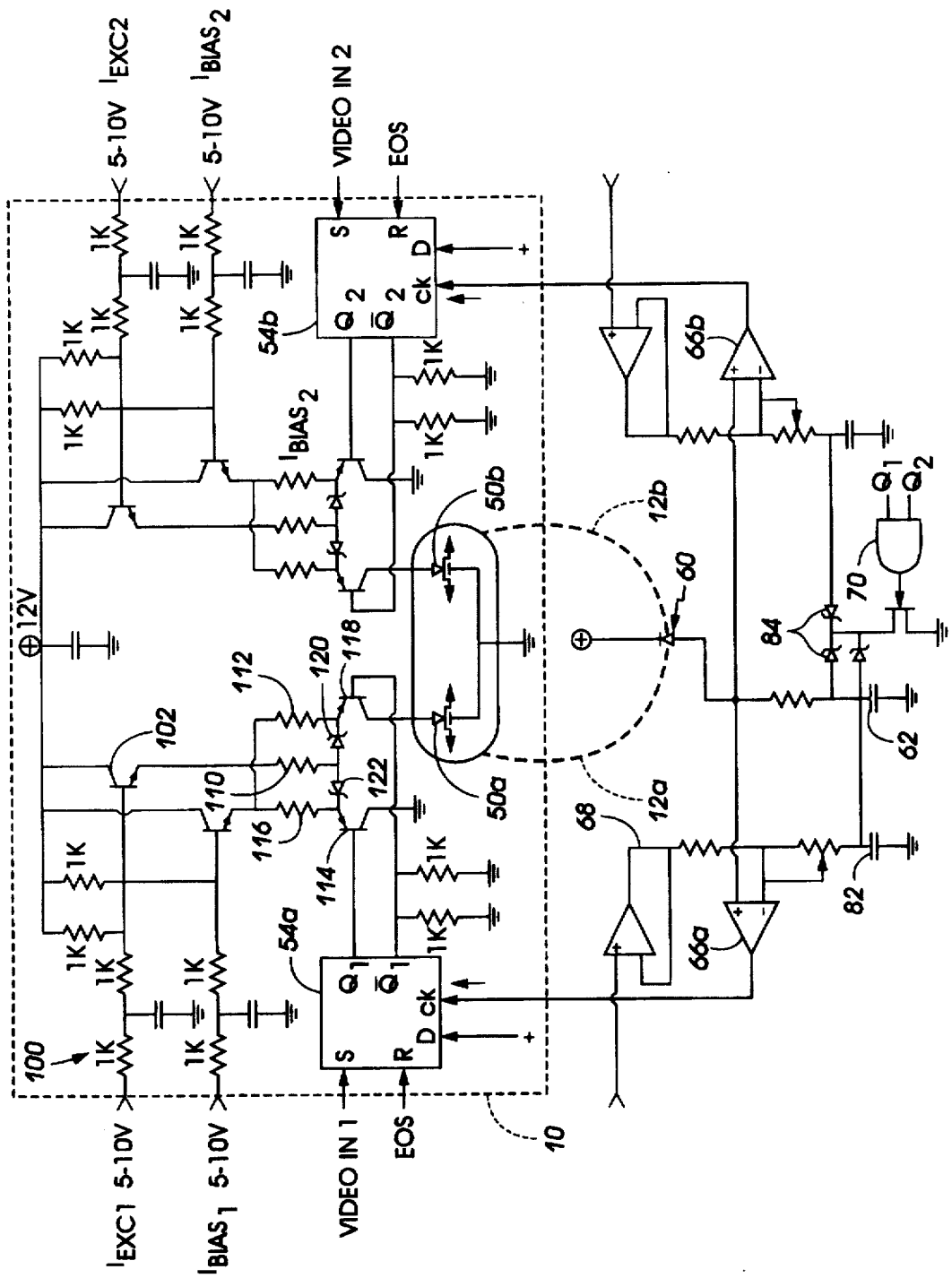
FIG. 4 is a schematic diagram showing a preferred embodiment of a dual-beam raster output scanner utilizing reflex exposure control.

FIG. 4 is a schematic diagram showing a reflex exposure-control system for use with two laser diodes 50a, 50b, monitored by a single sensor diode 60. It will be understood that the various elements that will be described in detail below and shown on the left side of FIG. 4 are configured to provide laser excitation current to first laser diode 50a and regulate writing beam 12a, and are mirrored by equivalent elements having the same functions with respect to the excitation of a second laser diode 50b and the regulation of writing beam 12b. It will be noted that the circuitry on the left side of FIG. 4 is responsive to the data stream marked VIDEO IN 1, which directly corresponds to the signal path labeled VIDEO OUT 1 shown in FIG. 2, while the right side of FIG. 4 is an identical circuit which responds to the data stream marked VIDEO IN 2, corresponding to the signal path marked VIDEO OUT 2 in FIG. 2.

The drive circuit is adapted to drive a laser diode indicated as 50a, forming part of laser source 10. The upper section of the schematic, generally indicated as 102, represents basic current supply circuits for developing the necessary bias and laser excitation currents from an external power supply. Although the configuration shown is preferred for one known embodiment of the drive circuit, it will be apparent that other configurations of current sources in circuit 102 are possible.

The two operational variables of circuit 102 are the laser excitation current $I_{EXC1}$, which is typically on the order of 20 to 35 ma, and the bias current $I_{BIAS1}$, which is typically about 50 ma. $I_{EXC1}$ is developed by the potential drop across resistor 110, while $I_{BIAS1}$ for transistors 114 and 118 is developed by the potential drop across resistors 112 and 116 of nominally equal value. As shown in the Figure, both $I_{EXC1}$ and $I_{BIAS1}$ flow to common point at the emitters of transistor 114 and 118. In the preferred embodiment of the invention, transistors 114 and 118 are PNP transistors operating in the grounded base configuration, and currents $I_{EXC1}$ and $I_{BIAS1}$ are summed at the emitters thereof, as shown.

Further, current $I_{EXC1}$ flows to the emitters of transistors 114 and 118 through Schottky diodes 120 and 122, respectively. As is known in the art, a Schottky diode consists of a junction in which majority carriers carry the current flow. When the diode is forward-biased, the carriers are injected into the metal side of the junction and remain "hot" with respect to the metal lattice. Consequently, such diodes can be switched at extremely high rates with a relatively small difference in forward bias potential.

As can further be seen in FIG. 4, the bases of transistors 114 and 118 are connected to the inverting and non-inverting outputs of a high speed flip-flop 54, the full function of which will be explained in detail below, which establishes the base potential of each transistor at one of the two complementary gate output operating voltages. When flip-flop 54 is in one of its two possible stable states, the base of transistor 114 is at a slightly higher potential than the base of transistor 118, and when flip-flop 54 is in its other stable state, the base of transistor 118 is at a slightly higher potential than the base of transistor 114. Thus, in toggling between its two normal operating states, flip-flop 54 raises the potential of one transistor base with respect to the other. Since both transistors are operating in the grounded base configuration and are not in the cutoff condition, the emitter of one of the transistors is correspondingly raised in potential with respect to the emitter of the other transistor.

Current $I_{EXC_1}$ from resistor 110 reaching the node between Schottky diodes 120 and 122 flows preferentially to the emitter of the transistor at the lowest potential. The output voltage swing of an emitter coupled gate such as flip flop 54 is typically larger than the differential forward voltage drop of Schottky diodes operated between cutoff and $I_{EXC_1}$ levels on the order of 20 to 35 ma. As a consequence, the entire current $I_{EXC_1}$ flows through the Schottky diode connected to the emitter at the lower potential, is summed with the bias current $I_{BIAS_1}$ flowing to that emitter, and is delivered to the transistor's collector. The collector of transistor 114, as shown, delivers current to the laser diode 50a, while the collector current of transistor 118 flows directly to ground. Thus roughly equal bias currents flow at all times through both transistor 114 and transistor 118, with the additional excitation current needed for laser action being shunted to one or the other collector depending on the state of flip flop 54. When $I_{EXC_1}$ is shunted to the emitter of transistor 114, it flows to laser diode 50a which is excited to lase at a specific power level in order to discharge one picture element on the photoreceptor surface. Conversely, when $I_{EXC_1}$ is shunted to the emitter of transistor 118 it flows directly to ground and only bias current $I_{BIAS_1}$ is delivered to the laser diode which is then below its lasing threshold. The high speed flip flop as recited in the claims, which functions to selectably shunt the lasing current to transistor 114 or transistor 118 may also be embodied by other electronic devices having a suitable output.

Viewing transistors 114 or 118 as current gates, it is evident that essentially constant values of currents $I_{BIAS_1}$ are supplied to the inputs of each gate, and an additional current $I_{EXC_1}$ is selectably shunted to one of the two inputs through a fast-response Schottky diode. The practical significance of this arrangement is that transistors 114 or 118 are never biased off at any time. Each transistor toggles between two highly conductive states instead of between a conduction and a cutoff condition. Thus the emitter, base, and collector of transistors 114 and 118 are always operated at low impedance. Also, by supplying both the bias and lasing current to laser diode 50 through one transistor collector instead of summing the collectors of separate bias and lasing current sources at the laser diode input, the parasitic capacitive load at the laser diode input is reduced, improving the overall system speed. The transient response of transistors 114 and 118 for transitions between the two logical gate output states is that of emitter followers, which are generally much faster than transistor switches making transitions between a conducting state and a condition where collector current is shut completely off.

Although the static currents supplied in the preferred embodiment are uncompensated for changes in temperature which affect transistor base characteristics, it will be understood that because the light output of laser diodes is itself a strong function of temperature, typical laser drive circuits are operated in a feedback loop whereby a light intensity sensing system operating in conjunction with the laser diode drive circuitry is used to monitor and continually adjust the mean laser beam power. As the drive circuit is modulated in response to digital data, the current switching function is actually performed by hot carrier Schottky diodes, which are much faster than most transistor switches and have relatively small forward voltage drop characteristics. For the circuit shown, using 10K ECL Logic, 2N3906 transistors, and the illustrated values of $I_{BIAS_1}$ and $I_{EXC_1}$, switching times have been shown to be significantly less than 2 nanoseconds under typical operating conditions.

The addition of currents at the input node of transistor 114 operating in the grounded-base configuration is essentially linear, providing the transistor is constrained to operate within an envelope of relatively high collector current gain. However, because the emitter-to-base forward voltage drop of transistor 114 changes slightly as a function of the net emitter current, the individual currents delivered by resistors 110 and 112 to the emitter node are not totally independent of each other. Since this interaction is on the order of only a few percent, it is easily compensated by adjusting the current control inputs of circuit 102. A laser control system using the present invention in combination with a feedback loop to monitor and continually adjust the two mean laser beam power levels would automatically compensate for the current interaction as well.

In the above embodiments, the advantage of incorporating Schottky diode 122 for the current path to ground is that by providing circuit symmetry, the interface with standard logic input is simplified, and the symmetric design provides superior differential temperature compensation. However, in applications where these considerations are not of importance, the Schottky diodes generally denoted as 122 employed on both sides of FIG. 4 to provide current paths to ground via transistors 118 may be omitted with no loss in dynamic circuit performance.

FIG. 4 further shows, in the lower portion thereof, the basic elements of a reflex laser control circuit according to the present invention. As shown in the schematic, a laser diode, indicated as 50a or 50b, which is intended to be provided within the laser source 10, is excited by means of current provided by the laser drive circuit. A sensor photodiode 60 is positioned to receive fixed portions of the total light flux emitted by laser diodes 50a or 50b. As shown in FIG. 1, sensor diode 60 may be placed, for example, off-axis with respect to the collimation optics forming the main writing beams 12a and 12b, in a position where a portion of the laser flux emitted from the front apertures of laser diodes 50a and 50b in the general direction of the collimation optics may be directed to sensor photodiode 60. Alternately, another design option is to locate sensor photodiode 60 in general alignment with the "back facet" of laser diodes 50a and 50b to collect light flux emitted through the rear reflectors of the laser diode cavities. What is important is that a fixed portion of the generated light flux be collected by sensor 60 so that the light output intensity of laser diode 50a or 50b can be monitored in real time.

Differential comparator 66 is configured to sense the voltage appearing on capacitor 62 with respect to a fixed reference voltage. The reference voltage is selected to yield optimal exposure from laser diode 50a in its intended ROS application. In addition to the value of capacitor 62 in the circuit, factors that affect the value of the reference voltage include the throughput efficiency of the ROS optical system as a whole, the intrinsic sensitivity of the photoreceptor surface, the width and speed of the photoreceptor, as well as the ROS system resolution and the fraction of the laser output power incident on sensor photodiode 60. In a fixed optical configuration with all these factors constant, sensor diode 60, in combination with capacitor 62, forms an electronic analog of the photoreceptor spot 16 being exposed either by beam 12a or 12b. Photocurrent proportional to the intensity of the incident light is generated in both the active volume of the sensor photodiode and the photoreceptor layer, and in both cases the integrated photocurrent causes a net change in the voltage on a capacitive element, which, in the photoreceptor case, is the capacity of the photoreceptor layer itself. As a result of the direct correspondence between the level of discharge of the photoreceptor and the voltage accumulated on capacitor 62, it can be seen that the circuit responds to the actual exposing efficacy of laser diode 50a or 50b in a consistent way under a wide range of operating conditions. In the preferred embodiment of the present invention, precise regulation of photoreceptor exposure is provided by controlling the duration of the laser diode excitation for each and every pixel area which is desired to be exposed on the photoreceptor surface.

It is the intended function of the circuit in FIG. 4 to act as a "reflex" exposure control system for laser diodes 50a and 50b. Sensor diode 60 in turn receives light directly from laser diode 50a or 50b; the received light is directly indicative of the cumulative exposure of the photoreceptor induced by writing beam 12a or 12b respectively. When the sensor diode 60 has received the correct measure of light flux from laser diode 50a or 50b (i.e., consistent with the desired exposure level of photoreceptor 18 by writing beam 12a or 12b), the system quenches the appropriate laser diode 50a or 50b. This "reflex" system obviates many real-time, real-world performance variations in the laser diodes such as 50a or 50b. If the power output of either laser diode 50a or 50b is relatively low due to an elevated ambient temperature or device aging, the system extends the duration of emission of each device appropriately until the correct measure of light flux has been detected by sensor diode 60; alternatively, if under certain conditions the intensity of the beam from laser diode 50a or 50b is relatively high, laser action is terminated sooner.

The cycle of accumulating charge and quenching the emission of a writing beam from laser diode 50a or 50b is preferably repeated for each and every pixel exposure represented by the incoming digital data stream. As is known in the art of binary or on-off raster output scanners, each sequential bit being either a 1 (true) or 0 (false) in the input data stream corresponds to one pixel in the printed image; of course in this embodiment the exposure cycle need only come into play when the pixel is intended to be discharged by the laser, i.e., when a logical 1 (true) appears at the S input of flip-flops 54a or 54b (controlling diodes 50a and 50b, respectively). In the absence of logical 1=true input, the system can be considered to be in the standby or inactive mode. The circuit of FIG. 2 is designed to provide short positive pulses to the S="set" inputs of flip-flops 54a and 54b to initiate lasing action in laser diodes 50a and 50b respectively on demand without interfering with the termination of laser emission which is under reflex control. It is the function of the rotating polygon 14, noted above, to scan the writing beams 12a and 12b created by laser diode 50a or 50b to sequential pixel-sized spots in the raster image being created on the photoreceptor.

There is further shown in FIG. 4 an operational amplifier circuit used to buffer the exposure adjustment input voltage, and source 68 is shown with an optional adjustment means. Resistor 80 provides the desirable voltage offset associated with capacitor 62 which has been selected for the desired RC value by measuring the time delay ΔT of the comparator 66 and flip-flop 54 in actual operation, as explained in the cross-referenced patent application. There is also provided, associated with reference voltage source 68, relatively large capacitors 81 and 82 which, in combination with Schottky diodes 84 and a fast field effect transistor, provides a system in which both inputs of comparators 66a and 66b (controlling diode 50b) are referenced to a common discharge level, by which common mode errors are minimized. The Schottky diodes are, after each cycle, discharged, through a switch associated with an OR gate 70, which, as shown, is connected to the $Q_1$, $Q_2$ signals which operate flip-flops 54a and 54b.

Although there is shown in the preferred embodiment herein a dual-beam raster output scanner with alternating operation of the laser diodes creating the writing beams, it will be apparent that the above-described system for monitoring the behavior of two separate laser diodes with reflex exposure control associated with a single sensor could readily be adapted for other multi-beam systems, in which, for example, the beams effectively function to expose a common picture element. Such an arrangement may be desired, for example, in a tri-level laser printing system, where different areas of a photoreceptor are desired to be discharged by specific, discrete, well regulated exposure levels. In such a case, the reflex exposure control itself could be made to operate in a split cycle such that, while the two light sources may be directed to expose a common picture element on the photoreceptor surface, the intensity of each light source is monitored in a half-cycle. It will also be evident that the present invention as here described could be extended to apply to a system for monitoring three or more laser diodes and multiple exposure levels.

While the invention has been described with reference to the structure disclosed, it is not confined to the details set forth, but is intended to cover such modifications or changes as may come within the scope of the following claims.

I claim:

1. A raster output scanner for an electrophotographic printer, comprising:

a first light source adapted to output a first beam and a second light source adapted to output a second beam;

means for scanning the first beam and the second beam across a photosensitive surface to form a first scan line and a second scan line respectively to expose pixel spots thereon, the first scan line being parallel to the second scan line and spaced from the second scan line by a predetermined number of scan lines; and a controller providing an alternating duty cycle whereby the first light source is disabled from exposing a pixel spot on the photosensitive surface during a first portion of the duty cycle, and the second light source is disabled from exposing a pixel spot on the photosensitive surface during a second portion of the duty cycle.

2. The scanner of claim 1, wherein the first scan line and the second scan line are spaced by an odd number of scan lines.

3. The scanner of claim 1, wherein the first light source and the second light source are oriented relative to the scanning means whereby pixel spots in the first scan line are oriented at a right angle relative to pixel spots in the second scan line.

4. The scanner of claim 1, further comprising a sensor for measuring light intensity from the first light source and the second light source.

5. The scanner of claim 4, further comprising an exposure controller associated with the sensor, the exposure controller synchronized with the controller whereby, during the first portion of the duty cycle, the exposure controller controls operation of the first light source, and, during the second portion of the duty cycle, the exposure controller controls operation of the second light source.

6. A raster output scanner for an electrophotographic printer, comprising:

a first light source adapted to output a first beam and a second light source adapted to output a second beam;

means for scanning the first beam and the second beam across a photosensitive surface to form a first scan line and a second scan line respectively to expose pixel spots thereon, the first scan line being parallel to the second scan line and spaced from the second scan line by a predetermined number of scan lines;

a controller providing an alternating duty cycle whereby the first light source is enabled to expose a pixel spot on the photosensitive surface during a first portion of the duty cycle, and the second light source is enabled to expose a pixel spot on the photosensitive surface during a second portion of the duty cycle;

a sensor for measuring light intensity from the first light source and the second light source; and an exposure controller associated with the sensor, the exposure controller synchronized with the controller whereby, during the first portion of the duty cycle, the exposure controller controls operation of the first light source, and, during the second portion of the duty cycle, the exposure controller controls operation of the second light source, the exposure controller including an accumulator associated with the sensor, adapted to accumulate charge created by the sensor resulting from light flux from the first light source or the second light source; and a comparator associated with the accumulator and the first light source and the second light source, adapted to monitor charge accumulated on the accumulator and output a quench signal when the charge accumulated on the accumulator exceeds a predetermined threshold level, the quench signal operating to turn off the first light source or the second light source respectively during the first portion or the second portion of the duty cycle.

7. The scanner of claim 6, the accumulator including a capacitor for accumulating charge created by the sensor resulting from light flux from the first light source or the second light source; and a predetermined resistance associated with the capacitor, the resistance and capacitor forming an RC circuit having a predetermined time constant associated therewith, wherein the time constant is of a duration suitable to compensate for a time delay of circuitry operating to turn off the first light source or the second light source in response to the charge accumulated on the accumulator exceeding the predetermined threshold level.

8. A raster output scanner for an electrophotographic printer, comprising:

a first light source adapted to output a first beam and a second light source adapted to output a second beam;

means for scanning the first beam and the second beam across a photosensitive surface to form a first scan line and a second scan line respectively to expose pixel spots thereon, the first scan line being parallel to the second scan line and spaced from the second scan line by a predetermined number of scan lines; and a single sensor for measuring light intensity from the first light source during a first portion of a periodic duty cycle and from the second light source during a second portion of the periodic duty cycle.

9. The raster output scanner of claim 8, further comprising an exposure controller associated with the sensor whereby, during the first portion of a periodic duty cycle, the exposure controller is enabled to control operation of the first light source, and, during the second portion of the duty cycle, the exposure controller is enabled to control operation of the second light source.

10. The raster output scanner of claim 9, wherein each of the first portion and the second portion of the duty cycle corresponds to an opportunity for creating a pixel spot on the photosensitive surface.

11. A raster output scanner for an electrophotographic printer, comprising:

a first light source adapted to output a first beam and a second light source adapted to output a second beam;

means for scanning the first beam and the second beam across a photosensitive surface to form a first scan line and a second scan line respectively to expose pixel spots thereon, the first scan line being parallel to the second scan line and spaced from the second scan line by a predetermined number of scan lines;

a single sensor for measuring light intensity from the first light source and the second light source; and an exposure controller associated with the sensor whereby, during the first portion of a periodic duty cycle, the exposure controller is enabled to control operation of the first light source, and, during the second portion of the duty cycle, the exposure controller is enabled to control operation of the second light source; the exposure controller including an accumulator associated with the sensor, adapted to accumulate charge created by the sensor resulting from light flux from the first light source or the second light source.; and a comparator associated with the accumulator and the first light source and the second light source, adapted to monitor charge accumulated on the accumulator and output a quench signal when the charge accumulated on the accumulator exceeds a predetermined threshold level, the quench signal operating to turn off the first light source or the second light source respectively during the first portion or the second portion of the duty cycle.

12. The raster output scanner of claim 11, the accumulator including a capacitor for accumulating charge created by the sensor resulting from light flux from the first light source or the second light source; and a predetermined resistance associated with the capacitor, the resistance and capacitor forming an RC circuit having a predetermined time constant associated therewith, wherein the time constant is of a duration suitable to compensate for a time delay of circuitry operating to turn off the first light source or the second light source in response to the charge accumulated on the accumulator exceeding the predetermined threshold level.

* * * * *